(12) United States Patent
Wu et al.

(10) Patent No.: US 8,953,899 B2
(45) Date of Patent: Feb. 10, 2015

(54) METHOD AND SYSTEM FOR RENDERING AN IMAGE FROM A LIGHT-FIELD CAMERA

(71) Applicants: National Taiwan University, Taipei (TW); Lite-On Technology Corp., Taipei (TW)

(72) Inventors: Jiun-Huei Wu, Taipei (TW); Hung-Ming Liu, Taipei (TW)

(73) Assignees: National Taiwan University, Taipei (TW); Lite-On Technology Corp., Taipei (TW)

( * ) Notice: Subject to any disclaimer, the term of this patent is extended or adjusted under 35 U.S.C. 154(b) by 0 days.

(21) Appl. No.: 14/279,458

(22) Filed: May 16, 2014

(65) Prior Publication Data

US 2014/0347548 A1 Nov. 27, 2014

(30) Foreign Application Priority Data

May 21, 2013 (TW) .............................. 102117892 A
Mar. 21, 2014 (TW) .............................. 103110696 A

(51) Int. Cl.
*G06K 9/40* (2006.01)
*H04N 5/232* (2006.01)

(52) U.S. Cl.
CPC ................................ *H04N 5/23212* (2013.01)
USPC ........ 382/255; 382/254; 382/274; 250/201.2; 250/201.8

(58) Field of Classification Search
CPC ........ G06T 5/003; G02B 3/005; G03B 11/00; G03B 17/00
USPC .......... 382/254, 255, 274; 345/620, 629, 630, 345/631, 633, 634, 641; 396/89; 250/201.2, 250/201.8
See application file for complete search history.

(56) References Cited

U.S. PATENT DOCUMENTS

| 8,345,144 | B1* | 1/2013 | Georgiev et al. ............... 348/340 |
| 8,471,920 | B2* | 6/2013 | Georgiev et al. ........... 348/221.1 |
| 2010/0310165 | A1* | 12/2010 | Chen et al. ..................... 382/167 |
| 2013/0088489 | A1* | 4/2013 | Schmeitz et al. .............. 345/419 |

* cited by examiner

*Primary Examiner* — Ali Bayat
(74) *Attorney, Agent, or Firm* — Rosenberg, Klein & Lee

(57) ABSTRACT

A method for rendering an image from a light-field camera, which generates a raw light-field image, includes: generating feature data, which includes feature elements associated with position information and obtained based on the raw light-field image and a preset threshold condition; generating a raw focused image from the raw light-field image; obtaining a virtual focus position that is designated on the raw focused image; and refocusing the raw focused image according to the virtual focus position by updating pixel values of pixels of the raw focused image that correspond respectively in position to the feature elements of the feature data, so as to generate a refocused image.

19 Claims, 4 Drawing Sheets

METHOD AND SYSTEM FOR RENDERING AN IMAGE FROM A LIGHT-FIELD CAMERA

CROSS-REFERENCE TO RELATED APPLICATION

This application claims priority of Taiwanese Patent Applications No. 102117892, filed on May 21, 2013, and No. 103110696, filed on Mar. 21, 2014.

BACKGROUND OF THE INVENTION

1. Field of the Invention

The invention relates to a method and a system for rendering an image, more particularly to a method and a system for rendering an image from a light-field camera.

2. Description of the Related Art

In recent years, light fields have been introduced into computer graphics and have been applied in many domains of our daily lives. Some companies now produce light-field cameras for different applications. A major technique of a light-field camera resides in an array of microlenses arranged between a main lens and a photosensor in a camera. Each of the microlenses is equivalent to a camera lens disposed at a distinct position. Each of the microlenses forms on the photosensor a respective micro-image which is composed of a plurality of pixels recording directions and intensities of light rays. Information associated with the directions and intensities is recorded by the same photosensor behind the array of microlenses with respect to the main lens. Computer software may be adopted to process the information so as to generate light-field data, such that a focus position of an image captured by a light-field camera may be changed arbitrarily based on the light-field data.

However, each time the focus point over the image is changed, all pixels of the image are usually required to undergo refocusing operations. Moreover, optical/mechanical autofocusing has its limitations on focusing speed. A current optical focusing system usually requires about 0.09 second to focus, which is substantially equal to the time period of three frames of motion pictures. Accordingly, for the purpose of effectively reducing unnecessary refocusing operations, solutions to overcome the aforementioned issues need to be found.

SUMMARY OF THE INVENTION

Therefore, an aspect of the present invention is to provide a method for rendering an image from a light-field camera. The light-field camera generates a raw light-field image in response to detecting light rays incident on a focal plane using a photosensor which detects the light rays from a scene. The light rays are incident on an array of microlenses and are passed to different locations on the focal plane. The raw light-field image is composed of a plurality of micro-images. The method of the present invention is to be implemented by an image rendering system and comprises:

(A) generating, by the image rendering system, a feature data, which includes feature elements associated with corresponding position information, associated with the raw light-field image, and obtained based on the raw light-field image and a preset threshold condition;

(B) generating, by the image rendering system, a raw focused image from the raw light-field image;

(C) obtaining, by the image rendering system, a virtual focus position that is designated on the raw focused image; and (D) refocusing, by the image rendering system, the raw focused image according to the virtual focus position by updating pixel values of pixels of the raw focused image that correspond respectively in position to the feature elements of the feature data, so as to generate a refocused image.

A first portion of pixels of the refocused image that correspond respectively in position to the feature elements of the feature data has pixel values which are determined by performing a refocusing operation upon the raw light-field image according to the virtual focus position. A second portion of the pixels of the refocused image that do not correspond in position to the feature elements of the feature data has pixel values which are determined according to pixel values of pixels of the raw focused image that correspond respectively in position to the second portion of the pixels of the refocused image.

Another aspect of the present invention is to provide a system for rendering an image from a light-field camera. The light-field camera generates a raw light-field image in response to detecting light rays incident on a focal plane using a photosensor which detects the light rays from a scene. The light rays are incident on an array of microlenses and are passed to different locations on the focal plane. The raw light-field image is composed of a plurality of micro-images. The system of the present invention comprises an image pre-processing unit, a set-up unit, and a focusing processing unit. The image pre-processing unit is configured to generate a feature data, which includes feature elements associated with corresponding position information, associated with the raw light-field image, and obtained based on the raw light-field image and a preset threshold condition, and is configured to generate a raw focused image from the raw light-field image. The set-up unit is configured to obtain a virtual focus position that is designated on the raw focused image. The focusing processing unit is configured to refocus the raw focused image according to the virtual focus position by updating pixel values of pixels of the raw focused image that correspond respectively in position to the feature elements of the feature data, so as to generate a refocused image. A first portion of pixels of the refocused image that correspond respectively in position to the feature elements of the feature data has pixel values which are determined by performing a refocusing operation upon the raw light-field image according to the virtual focus position. A second portion of the pixels of the refocused image that do not correspond in position to the feature elements of the feature data has pixel values which are determined according to pixel values of pixels of the raw focused image that correspond respectively in position to the second portion of the pixels of the refocused image.

BRIEF DESCRIPTION OF THE DRAWINGS

Other features and advantages of the present invention will become apparent in the following detailed description of preferred embodiments with reference to the accompanying drawings, of which.

DETAILED DESCRIPTION OF THE PREFERRED EMBODIMENTS

Figure 1:
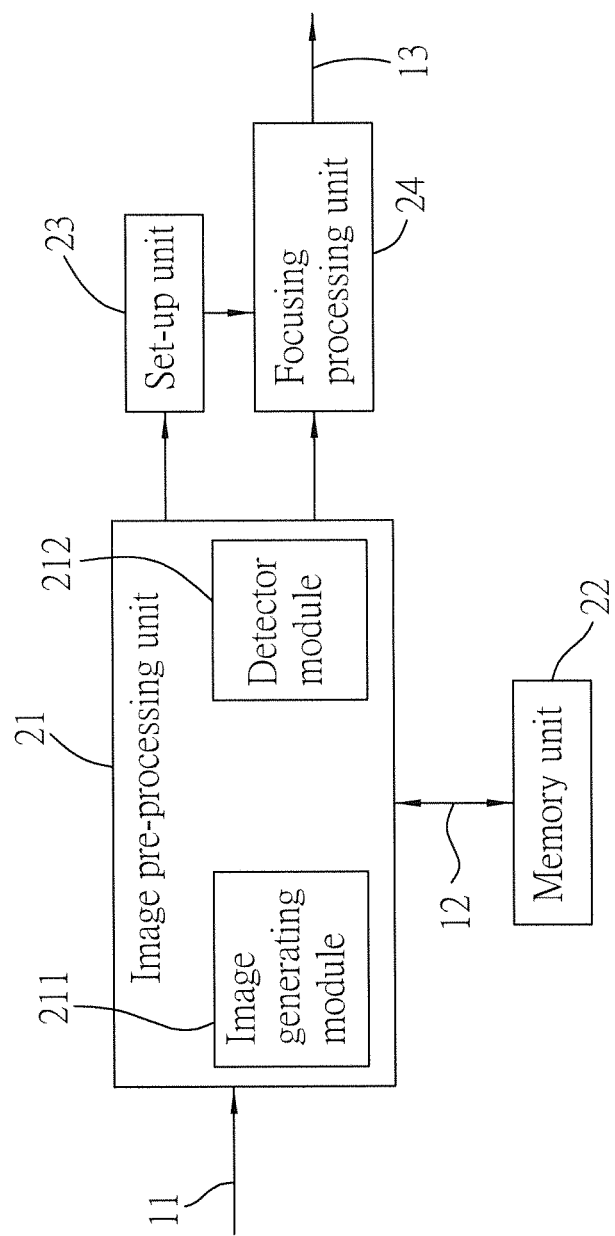
FIG. 1 is a block diagram illustrating a preferred embodiment of a system for rendering an image from a light-field camera according to the present invention.

Referring to FIG. 1, a system for rendering an image from a light-field camera according to the present invention is suitable for performing refocusing operations upon a raw light-field image 11 that is received from a light-field camera so as to generate a refocused image 13. The light-field camera generates the raw light-field image 11 by capturing an image of a scene. The light-field camera (not shown) includes a main lens, an array of microlenses, a photosensor and a display unit.

In the preferred embodiment of the system, the raw light-field image 11 is composed of a plurality of micro-images. The light-field camera generates the raw light-field image 11 in response to detecting light rays incident on a focal plane using the photosensor which detects the light rays from the scene. The light rays are incident on the array of microlenses and are passed to different locations on the focal plane. Specifically, the main lens of the light-field camera refracts light beams emitted from any point of the scene, and the light beams pass through the microlenses to form the micro-images on distinct positions of the photosensor. Each of the micro-images records a respective portion of the screen from different viewing angles. Moreover, if the array of microlenses includes an orderly arrangement of M×N microlenses, the raw light-field image 11 is composed of the micro-images with a number equal to that of the microlenses (i.e., M×N micro-images), in which, M and N represent natural numbers.

The preferred embodiment of the system according to the present invention comprises an image pre-processing unit 21, a memory unit 22 connected electrically to the image pre-processing unit 21, a set-up unit 23, and a focusing processing unit 24 connected electrically to the image pre-processing unit 21 and the set-up unit 23. The image pre-processing unit 21 includes an image generating module 211 and a detector module 212.

The display unit of the light-field camera is utilized to display a raw focused image 12. The image pre-processing unit 21, prior to a refocusing operation, processes the raw light-field image 11 so as to generate the raw focused image 12. The memory unit 22 is utilized to store the raw focused image 12. A pixel number of the raw focused image 12 is equal to the number of the micro-images of the raw light-field image 11. Moreover, each of pixels of the raw focused image 12 corresponds to a respective one of the micro-images of the raw light-field image 11. Therefore, according to the aforementioned example, a resolution of the raw focused image 12 is M×N.

In the preferred embodiment of the system according to the present invention, after the light-field camera captures an image of the scene with a preset focus position in an initial state, the raw focused image 12 is generated by the image pre-processing unit 21 through a conventional arithmetic process. For example, the image pre-processing unit 21 calculates an average or a weighted average of pixel values of each of the micro-images of the raw light-field image 11, and arranges a pixel with a pixel value equal to the average or the weighted average thus calculated according to the arrangement of a respective one of the micro-images, so as to generate the raw focused image 12 that is focused at the preset focus position. Alternatively, the image pre-processing unit 21 may generate the raw focused image 12 based on a central pixel of each of the micro-images, such that each of the pixels of the raw focused image 12 has a pixel value equal to that of the central pixel of a respective one of the micro-images.

The image pre-processing unit 21 performs image pre-processing upon the micro-images of the raw light-field image 11. In the image pre-processing of the preferred embodiment, the image pre-processing unit 21 obtains a plurality of feature elements and a plurality of non-feature elements, which are associated respectively with corresponding position information and which are associated respectively with the raw light-field image 11, based on image information of the raw light-field image 11 and a preset threshold condition, so as to generate feature data. In this embodiment, the feature elements are feature pixels, the non-feature elements are non-feature pixels, and the feature data is a feature image composed of the feature pixels and the non-feature pixels with a resolution of M×N. Subsequently, the image pre-processing unit 21 retrieves the raw focused image 12, and tags pixels of the raw focused image 12 that correspond respectively in position to the feature pixels of the feature image as to-be-processed pixels.

Figure 4:
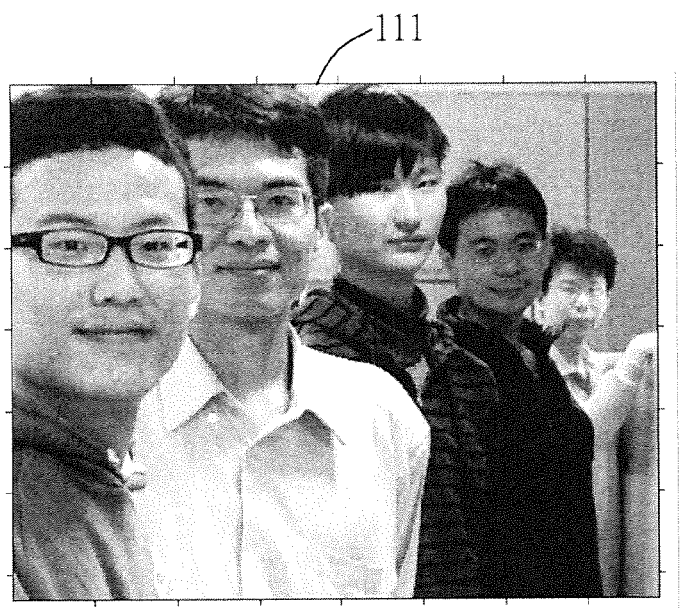
FIG. 4 illustrates an exemplary full depth-of-field image generated in the preferred embodiment of the method according to the present invention.
Figure 5:
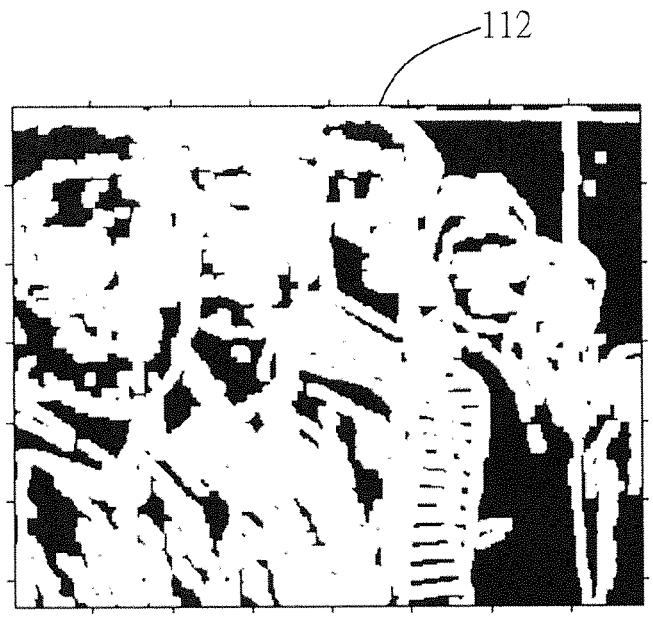
FIG. 5 illustrates an exemplary feature image generated in the preferred embodiment of the method according to the present invention.

Referring to FIGS. 1, 4 and 5, detailed procedures of the aforementioned image pre-processing of the preferred embodiment of the system are described hereinafter.

The image generating module 211 obtains the pixel values of the central pixels of the micro-images of the raw light-field image 11, and arranges the central pixels according to the arrangement of the micro-images so as to generate a full depth-of-field image 111 with a resolution of M×N based on the pixel values thus obtained. A principle of this procedure is equivalent to placing a mask, which has a pinhole in the center of the mask, in front of the main lens such that light beams passing through the pinhole are directed exactly at centers of the microlenses. Like the concept of pinhole imaging, a result of imaging by this procedure may have a characteristic of full depth-of-field.

Subsequently, the detector module 212 performs a gradient operation upon the full depth-of-field image 111 so as to obtain gradient information of pixels of the full depth-of-field image 111, and generates the feature image based on the gradient information and the preset threshold condition. Preferably, each of the pixels of the full depth-of-field image 111 having the gradient information with a magnitude greater than the preset threshold condition forms a respective one of the feature pixels of the feature image, and the remaining pixels of the full depth-of-field image 111 form non-feature pixels of the feature image. The detector module 212 afterwards, based on a distribution of the feature pixels over the feature image, tags the pixels of the raw focused image 12 that correspond respectively in position to the feature pixels of the feature image as the to-be-processed pixels. It is noted that, the preset threshold condition is not limited to a threshold value and may be set up by a user in advance.

In the preferred embodiment of the system according to the present invention, the detector module 212 adopts an operator selected from the group consisting of the Canny operator, the Sobel operator and the Laplacian operator for performing the gradient operation upon the full depth-of-field image 111. For example, the feature image may be a binarized edge image 112 (see FIG. 5). Feature pixels of the edge image 112 constitute a white area of the edge image 112 as shown in FIG. 5, and non-feature pixels of the edge image 112 constitute a black area of the edge image 112 as shown in FIG. 5

Referring to FIG. 1, detailed procedures of a variation of the image pre-processing in the preferred embodiment are illustrated hereinafter.

The image generating module 211 performs geometric transformations upon pixels of the micro-images of the raw light-field image 11 so as to generate an epipolar image (not shown). Since calculations associated with the geometric transformations are known to those skilled in the art, details of the same are omitted herein for the sake of brevity.

Subsequently, the detector module 212 performs a gradient operation upon the epipolar image so as to obtain gradient information of pixels of the epipolar image, and generates a feature image based on the gradient information and the preset threshold condition. Preferably, each of the pixels of the epipolar image having the gradient information with an absolute value greater than the preset threshold condition forms a respective one of the feature pixels of the feature image, and the remaining pixels of the epipolar image form non-feature pixels of the feature image. The detector module 212 afterwards, based on a distribution of the feature pixels over the feature image, tags the pixels of the raw focused image 12 that correspond respectively in position to the feature pixels of the feature image as the to-be-processed pixels. It is noted that the preset threshold condition in the variation of the preferred embodiment may be different from the preset threshold condition of the preferred embodiment of the system of the present invention, and may be set up by the user in advance. Therefore, when the user views the raw focused image 12 through the display unit of the light-field camera, the set-up unit 23 is utilized to obtain a virtual focus position that is designated by the user on the raw focused image 12 and that is associated with a focal depth in the scene at which an object in the scene desired to be focused is located. After obtaining the virtual focus position, the set-up unit 23 transmits an instruction including the virtual focus position to the focusing processing unit 24. In this preferred embodiment, the set-up unit 23 is a touch screen, but should not be limited to the disclosure herein.

The focusing processing unit 24, based on what condition of each of the pixels of the raw focused image 12 is tagged in the preferred embodiment or in the variation of the same, is configured to refocus the raw focused image 12 according to the virtual focus position by updating pixel values of the pixels of the raw focused image 12 that correspond respectively in position to the feature pixels of the feature image, so as to generate a refocused image 13 that has a resolution equal to that of the feature image.

It is worth noting that a first portion of pixels of the refocused image 13 that correspond respectively in position to the feature pixels of the feature image has pixel values which are determined by performing the refocusing operation upon the raw light-field image 11 according to the virtual focus position. Furthermore, the remaining pixels, i.e., a second portion of the pixels of the refocused image 13 that do not correspond in position to the feature pixels of the feature image, have pixel values which are determined according to pixel values of pixels of the raw focused image 12 that correspond respectively in position to the second portion of the pixels of the refocused image 13. Preferably, the second portion of the pixels of the refocused image 13 has pixel values equal to those of the pixels of the raw focused image 12 that correspond respectively in position to the second portion of the pixels of the refocused image 13 (i.e., the corresponding pixel values of the raw focused image 12 may be adopted directly without additional operations). It is noted that since focusing algorithms for the refocusing operation performed upon the raw light-field image 11 are known to those skilled in the art, details thereof are omitted herein for the sake of brevity.

In the preferred embodiment of the system, pixel values of the second portion of the pixels of the refocused image 13, which correspond respectively in position to the non-feature pixels of the feature image, are obtained from the raw focused image 12. The raw focused image 12 may be the aforementioned full depth-of-field image 111 obtained according to pinhole imaging, that is each of the pixels of the raw focused image 12 has the pixel value equal to that of the central pixel of a respective one of the micro-images. Alternatively, each of the pixels of the raw focused image 12 may have the pixel value equal to an average or a weighted average of pixel values of the respective one of the micro-images.

Figure 2:
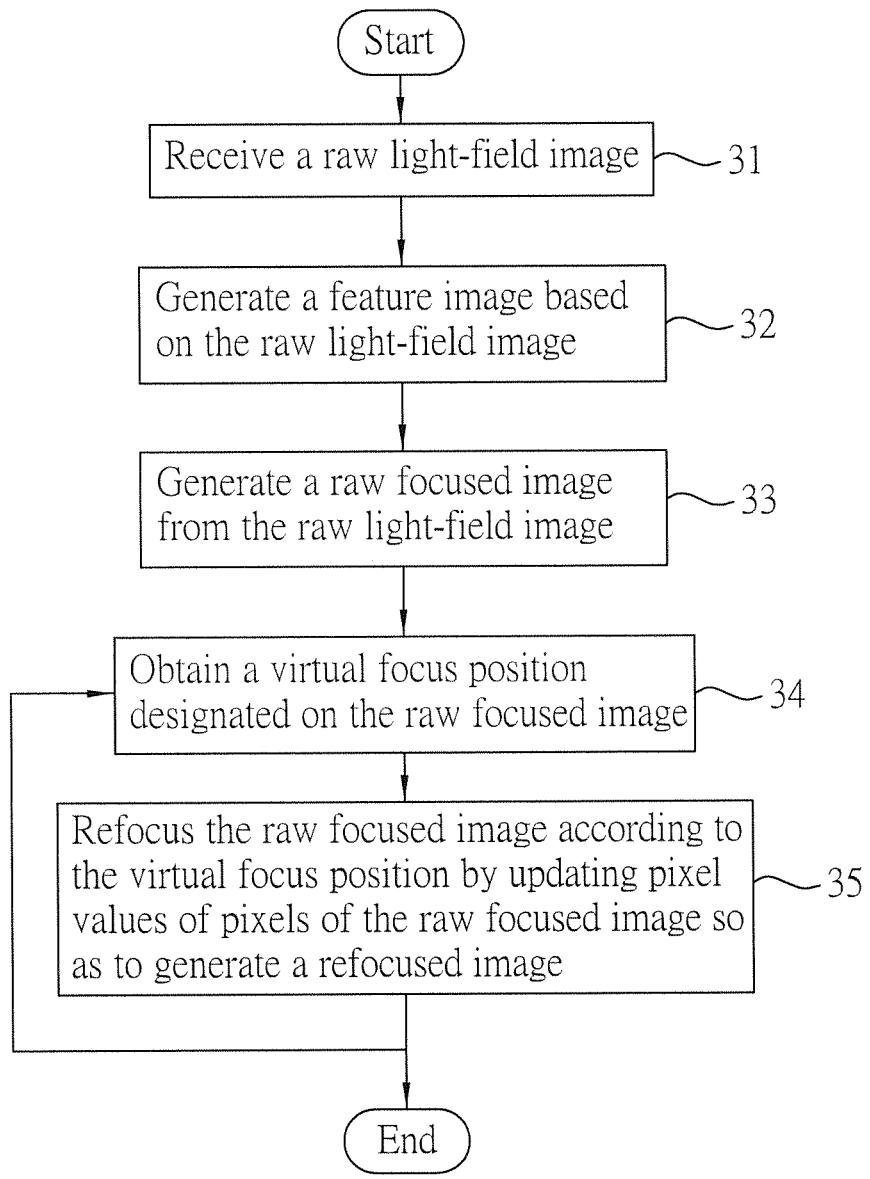
FIG. 2 is a flow chart illustrating a preferred embodiment of a method for rendering an image from a light-field camera according to the present invention.

Referring to FIG. 1 and FIG. 2, a preferred embodiment of a method for rendering an image from a light-field camera according to the present invention is illustrated. The method is to be implemented by the aforementioned system of the present invention.

In step 31, the image pre-processing unit 21 is configured to receive a raw light-field image 11.

In step 32, the image pre-processing unit 21 is further configured to generate a feature image, which includes feature pixels associated with the raw light-field image 11 and obtained based on the raw light-field image 11 and a preset threshold condition. Step 32 includes the following sub-steps 321 and 322.

Figure 3:
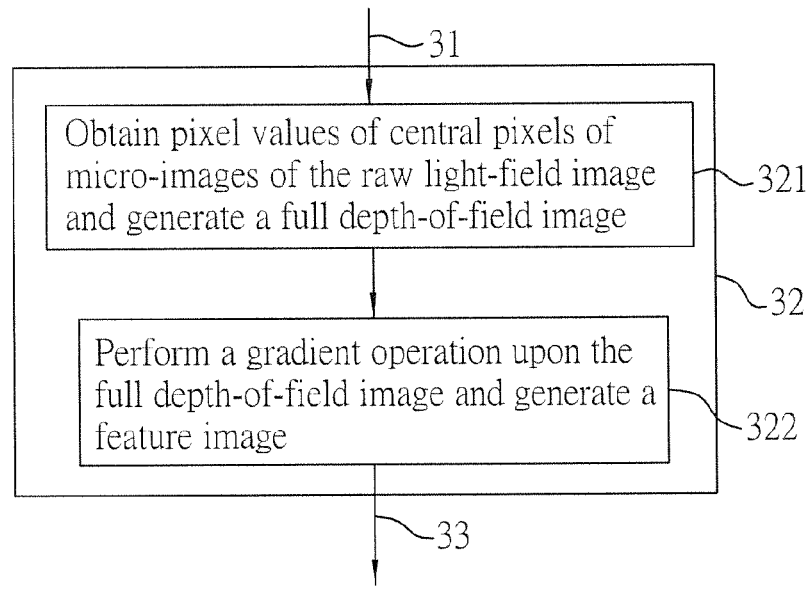
FIG. 3 is a flow chart illustrating sub-steps for generating a feature image in the preferred embodiment of the method according to the present invention.

Referring to FIG. 3 to FIG. 5, in sub-step 321, the image generating module 211 is configured to obtain pixel values of central pixels of the micro-images of the raw light-field image 11, and is configured to generate a full depth-of-field image 111 based on the pixel values obtained thereby.

Subsequently, in sub-step 322, the detector module 212 is configured to perform a gradient operation upon the full depth-of-field image 111 so as to obtain gradient information of pixels of the full depth-of-field image 111, and is configured to generate the feature image based on the gradient information and the preset threshold condition. The gradient operation is performed by the detector module 212 using an operator selected from the group consisting of the Canny operator, the Sobel operator and the Laplacian operator.

In a variation of the preferred embodiment of the method according to the present invention, step 32 may include the following sub-steps 323 and 324.

Figure 6:
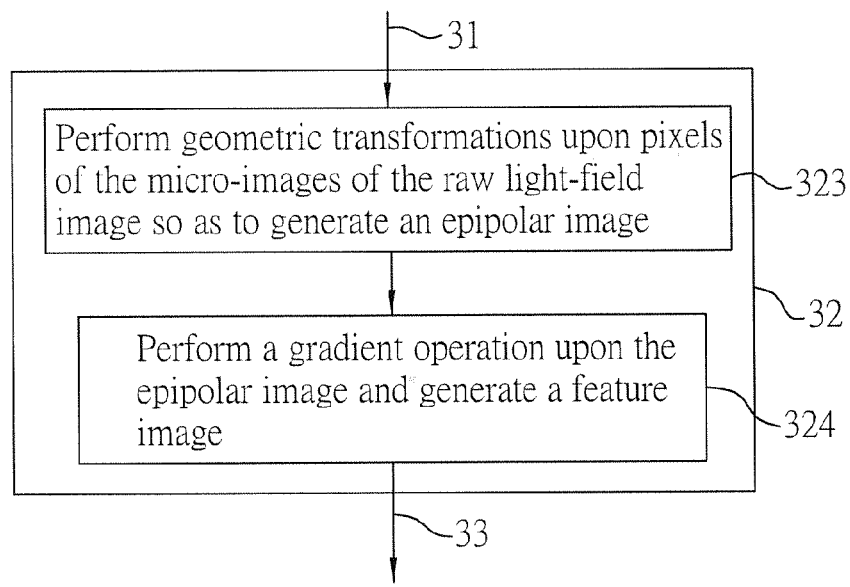
FIG. 6 is a flow chart illustrating a variation of the sub-steps for generating the feature image in the preferred embodiment of the method.

Referring to FIG. 6, in sub-step 323, the image generating module 211 is configured to perform geometric transformations upon pixels of the micro-images of the raw light-field image 11 so as to generate an epipolar image.

Subsequently, in sub-step 324, the detector module 212 is configured to perform a gradient operation upon the epipolar image so as to obtain gradient information of pixels of the epipolar image, and is configured to generate a feature image based on the gradient information and the preset threshold condition.

Referring once again to FIG. 2, subsequent to step 32, in step 33, the image pre-processing unit 21 is configured to generate a raw focused image 12 from the raw light-field image 11.

In this embodiment, each of the pixels of the raw focused image 12 corresponds to a respective one of the micro-images of the raw light-field image 11, and has a pixel value equal to that of a central pixel of the respective one of the micro-images. Alternatively, each of the pixels of the raw focused image 12 has a pixel value equal to an average or a weighted average of pixel values of the respective one of the micro-images.

In step 34, the set-up unit 23 is configured to obtain a virtual focus position that is designated on the raw focused image 12.

In step 35, the focusing processing unit 24 is configured to refocus the raw focused image 12 according to the virtual focus position obtained through the set-up unit 23 by updating pixel values of pixels of the raw focused image 12 that correspond respectively in position to the feature pixels of the feature image, so as to generate a refocused image 13. Specifically, a first portion of pixels of the refocused image 13 that correspond respectively in position to the feature pixels of the feature image has pixel values which are determined by performing a refocusing operation upon the raw light-field image 11 according to the virtual focus position. The remaining pixels, i.e., a second portion of the pixels of the refocused image 13 that correspond respectively in position to the non-feature pixels of the feature image, have pixel values which are determined according to pixel values of pixels of the raw focused image 12 that correspond respectively in position to the second portion of the pixels of the refocused image 13. Preferably, the second portion of the pixels of the refocused image 13 has pixel values equal to the pixel values of the pixels of the raw focused image 12 that correspond respectively in position to the second portion of the pixels of the refocused image 13.

It is noted that, in practice, steps of the method for rendering an image from a light-field camera is not limited to be performed in an order disclosed in the preferred embodiment, and the order may be adjusted according to different needs.

It is worth noting that, if the user intends to set a new virtual focus position for the identical raw light-field image 11, steps 34 to 35 may be performed once again so as to obtain a new refocused image 13. It is not necessary to perform the refocusing operation upon every pixel of the raw light-field image 11, and it is only required to perform the operation upon pixels corresponding to the feature pixels of the feature image.

To sum up, in the present invention, the image pre-processing unit 21 determines in advance, based on image content of the raw light-field image 11, whether or not the pixel value of each pixel of the refocused image 13 is required to be obtained through the refocusing operation, so as to exclude the pixels of the refocused image 13 that are not required to undergo the refocusing operation. In this way, time required for refocusing operation may be saved so as to promote an overall efficiency of image processing.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for rendering an image from a light-field camera, the light-field camera generating a raw light-field image in response to detecting light rays incident on a focal plane using a photosensor which detects the light rays from a scene, the light rays being incident on an array of microlenses and passed to different locations on the focal plane, the raw light-field image being composed of a plurality of micro-images, the method to be implemented by an image rendering system and comprising:

(A) generating, by the image rendering system, feature data, which includes feature elements associated with corresponding position information, associated with the raw light-field image, and obtained based on the raw light-field image and a preset threshold condition;

(B) generating, by the image rendering system, a raw focused image from the raw light-field image;

(C) obtaining, by the image rendering system, a virtual focus position that is designated on the raw focused image; and (D) refocusing, by the image rendering system, the raw focused image according to the virtual focus position by updating pixel values of pixels of the raw focused image that correspond respectively in position to the feature elements of the feature data, so as to generate a refocused image;

wherein a first portion of pixels of the refocused image that correspond respectively in position to the feature elements of the feature data has pixel values which are determined by performing a refocusing operation upon the raw light-field image according to the virtual focus position; and wherein a second portion of the pixels of the refocused image that do not correspond in position to the feature elements of the feature data has pixel values which are determined according to pixel values of pixels of the raw focused image that correspond respectively in position to the second portion of the pixels of the refocused image.

2. The method according to claim 1, wherein the second portion of the pixels of the refocused image has pixel values equal to the pixel values of the pixels of the raw focused image that correspond respectively in position to the second portion of the pixels of the refocused image.

3. The method according to claim 1, wherein step (A) includes the sub-steps of:

(A1) obtaining, by the image rendering system, pixel values of central pixels of the micro-images of the raw light-field image, and generating a full depth-of-field image based on the pixel values thus obtained; and (A2) performing, by the image rendering system, a gradient operation upon the full depth-of-field image so as to obtain gradient information of pixels of the full depth-of-field image, and generating the feature data based on the gradient information and the preset threshold condition.

4. The method according to claim 3, wherein the full depth-of-field image generated in step (A1) is composed of pixels having the pixel values of the central pixels thus obtained.

5. The method according to claim 3, wherein, in sub-step (A2), the gradient operation is performed using an operator selected from the group consisting of the Canny operator, the Sobel operator and the Laplacian operator.

6. The method according to claim 3, wherein, in sub-step (A2), each of the pixels of the full depth-of-field image having the gradient information with a magnitude greater than the preset threshold condition forms a respective one of the feature elements of the feature data.

7. The method according to claim 1, wherein step (A) includes the sub-steps of:

(A3) performing, by the image rendering system, geometric transformations upon pixels of the micro-images of the raw light-field image so as to generate an epipolar image; and (A4) performing, by the image rendering system, a gradient operation upon the epipolar image so as to obtain gradient information of pixels of the epipolar image, and generating the feature data based on the gradient information and the preset threshold condition.

8. The method according to claim 7, wherein, in sub-step (A4), the gradient operation is performed using an operator selected from the group consisting of the Canny operator, the Sobel operator and the Laplacian operator.

9. The method according to claim 7, wherein, in sub-step (A4), each of the pixels of the epipolar image having the gradient information with an absolute value greater than the preset threshold condition forms a respective one of the feature elements of the feature data.

10. The method according to claim 1, wherein, in step (B), each of the pixels of the raw focused image corresponds to a respective one of the micro-images of the raw light-field image, and has a pixel value equal to that of a central pixel of the respective one of the micro-images.

11. The method according to claim 1, wherein, in step (B), each of the pixels of the raw focused image corresponds to a respective one of the micro-images of the raw light-field image, and has a pixel value equal to an average or a weighted average of pixel values of the respective one of the micro-images.

12. A system for rendering an image from a light-field camera, the light-field camera generating a raw light-field image in response to detecting light rays incident on a focal plane using a photosensor which detects the light rays from a scene, the light rays being incident on an array of microlenses and passed to different locations on the focal plane, the raw light-field image being composed of a plurality of micro-images, said system comprising:
   an image pre-processing unit configured to generate feature data, which includes feature elements associated with corresponding position information, associated with the raw light-field image, and obtained based on the raw light-field image and a preset threshold condition, and configured to generate a raw focused image from the raw light-field image;
   a set-up unit configured to obtain a virtual focus position that is designated on the raw focused image; and
   a focusing processing unit configured to refocus the raw focused image according to the virtual focus position by updating pixel values of pixels of the raw focused image that correspond respectively in position to the feature elements of the feature data, so as to generate a refocused image;
   wherein a first portion of pixels of the refocused image that correspond respectively in position to the feature elements of the feature data has pixel values which are determined by performing a refocusing operation upon the raw light-field image according to the virtual focus position; and
   wherein a second portion of the pixels of the refocused image that do not correspond in position to the feature elements of the feature data has pixel values which are determined according to pixel values of pixels of the raw focused image that correspond respectively in position to the second portion of the pixels of the refocused image.

13. The system according to claim 12, wherein the second portion of the pixels of the refocused image has pixel values equal to the pixel values of the pixels of the raw focused image that correspond respectively in position to the second portion of the pixels of the refocused image.

14. The system according to claim 12, wherein said image pre-processing unit includes:
   an image generating module configured to obtain pixel values of central pixels of the micro-images of the raw light-field image, and configured to generate a full depth-of-field image based on the pixel values obtained thereby; and
   a detector module configured to perform a gradient operation upon the full depth-of-field image so as to obtain gradient information of pixels of the full depth-of-field image, and configured to generate the feature data based on the gradient information and the preset threshold condition.

15. The system according to claim 14, wherein the gradient operation is performed by said detector module using an operator selected from the group consisting of the Canny operator, the Sobel operator and the Laplacian operator.

16. The system according to claim 12, wherein said image pre-processing unit includes:
   an image generating module configured to perform geometric transformations upon pixels of the micro-images of the raw light-field image so as to generate an epipolar image; and
   a detector module configured to perform a gradient operation upon the epipolar image so as to obtain gradient information of pixels of the epipolar image, and configured to generate the feature data based on the gradient information and the preset threshold condition.

17. The system according to claim 16, wherein the gradient operation is performed by said detector module using an operator selected from the group consisting of the Canny operator, the Sobel operator and the Laplacian operator.

18. The system according to claim 12, wherein each of the pixels of the raw focused image corresponds to a respective one of the micro-images of the raw light-field image, and has a pixel value equal to that of a central pixel of the respective one of the micro-images.

19. The system according to claim 12, wherein each of the pixels of the raw focused image corresponds to a respective one of the micro-images of the raw light-field image, and has a pixel value equal to an average or a weighted average of pixel values of the respective one of the micro-images.

* * * * *